B. W. STOUFFER.
LOCK FOR SWING JOINTS.
APPLICATION FILED SEPT. 2, 1908.
961,552.
Patented June 14, 1910.
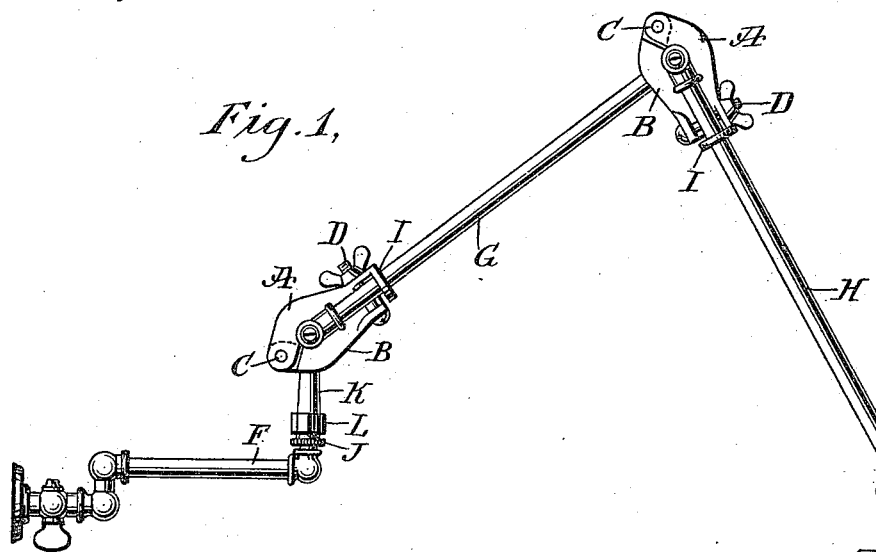
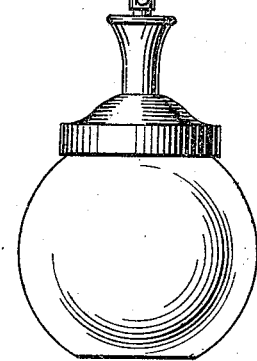
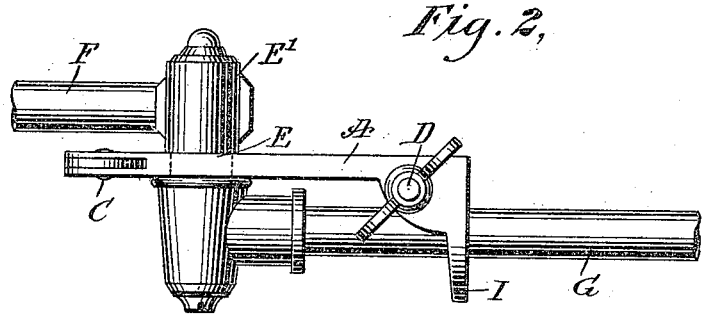
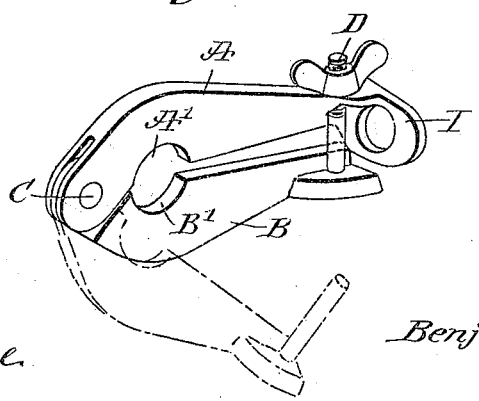
WITNESSES
Edward Thorpe
INVENTOR
Benjamin W. Stouffer
BY Munn & Co.
ATTORNEYS

UNITED STATES PATENT OFFICE.

BENJAMIN W. STOUFFER, OF PITTSBURG, PENNSYLVANIA.

LOCK FOR SWING-JOINTS.

961,552.  Specification of Letters Patent.  Patented June 14, 1910.

Application filed September 2, 1908. Serial No. 451,285.

*To all whom it may concern:*

Be it known that I, BENJAMIN W. STOUFFER, a citizen of the United States, and a resident of Pittsburg, in the county of Allegheny and State of Pennsylvania, have invented a new and Improved Lock for Swing-Joints, of which the following is a full, clear, and exact description.

The object of the invention is to provide a new and improved lock for swing joints, more especially designed for use in flexible pipe connections, such, for instance, as are employed between a gas fixture and a gas stove, gas burner, gas lamp and the like, and arranged to provide means for conveniently locking the swing joint with a view to permit swinging the connected sections into a desired position, one relatively to the other, and to hold the sections in adjusted position.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a side elevation of the improvement as applied to the flexible connection between a gas bracket and a gas lamp; Fig. 2 is an enlarged plan view of the same; and Fig. 3 is a perspective view of the lock.

The improved lock consists essentially of two members A and B, connected with each other by a pivot C, to permit of swinging the members A and B into an open or a closed position, the free ends of the members A and B being connected with each other by a bolt D, the nut of which is preferably in the form of a wing nut. The opposite sides of the members A and B are provided adjacent to the pivot C with half round bearings A', B' for clampingly engaging the transverse member E of the pipe section F, and on which member E the adjacent pipe section G is mounted to swing, as plainly indicated in Figs. 1 and 2, it being understood that a similar arrangement is between the free end of the pipe section G and another pipe section H, as indicated in Fig. 1, and as many such locks may be employed as there are pipe sections in the flexible fixtures. The free end of the member A of the lock is provided with a transversely-extending eye I through which extends the pipe section G or H. Now when the wing nut of the bolt D is loosened, the section G can be readily swung into the desired angular position relative to the section F, and when the desired position is reached the operator screws up the wing nut of the bolt D, so as to swing the members A and B toward each other, thus causing the bearings A', B' to firmly engage the member E of the pipe F, to securely hold the lock on the member E, and as the member A of the lock engages the pipe G at the eye I, it is evident that the pipe G is held against movement by the lock. In a similar manner the pipe section H can be adjusted relatively to the pipe section G, and then the sections can be locked in the adjusted position by means of the lock connecting the sections G and H with each other, as above described, and shown in Fig. 1.

Although I have shown and described the improvement in all its details, it is understood that I do not limit myself to the exact construction shown and described, as the same may be varied without deviating from the spirit of my invention.

Having thus described my invention, I claim as new and desire to secure by Letters Patent:

1. A locking device for swing sections of fixtures, comprising two members hinged together and adapted to be clamped onto one of the sections, one of the members having a lateral bearing at its free end engaging the other section, and a bolt connecting the free ends of the members with each other.

2. A locking device for swing sections of fixtures, comprising two members hinged together and each provided adjacent to the pivot with a half round bearing, one of the members being provided at its free end with a lateral apertured projection, a bolt secured to one member and projecting through the other, and a nut on the bolt.

3. A locking device for swing sections of fixtures, comprising two members connected together to swing toward and from each other and provided with means for clamping them on one of the sections of the fixtures, the members having bearings to receive the said section and one of the members having laterally projecting means for engaging the other section.

In testimony whereof I have signed my name to this specification in the presence of two subscribing witnesses.

BENJAMIN W. STOUFFER.

Witnesses:
C. H. VAN DYKE,
H. D. RICKENBACH.